(12) United States Patent
Funaoka et al.

(10) Patent No.: US 8,942,271 B2
(45) Date of Patent: Jan. 27, 2015

(54) BLOWER APPARATUS AND GAS LASER OSCILLATION APPARATUS

(75) Inventors: Kouji Funaoka, Chiyoda-ku (JP); Takayuki Nakayama, Chiyoda-ku (JP); Tomohiro Kyoto, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 0 days.

(21) Appl. No.: 14/114,666

(22) PCT Filed: Jun. 9, 2011

(86) PCT No.: PCT/JP2011/063225
§ 371 (c)(1),
(2), (4) Date: Oct. 29, 2013

(87) PCT Pub. No.: WO2012/169036
PCT Pub. Date: Dec. 13, 2012

(65) Prior Publication Data
US 2014/0086270 A1    Mar. 27, 2014

(51) Int. Cl.
*H01S 3/22*        (2006.01)
*H01S 3/223*       (2006.01)
(Continued)

(52) U.S. Cl.
CPC ............ *F04D 29/644* (2013.01); *F04D 29/601* (2013.01); *F04D 29/668* (2013.01); *F04D 29/64* (2013.01); *H01S 3/036* (2013.01)
USPC .................... 372/58; 372/55; 372/56; 372/57; 372/59; 372/60; 372/61; 454/228; 454/230; 454/184; 415/213.1; 415/214.1; 415/215.1; 415/220; 415/119

(58) Field of Classification Search
CPC ......... H01S 3/036; H01S 3/225; H01S 3/041; H01S 3/097; H01S 3/038; H01S 3/03; H01S 3/22; H01S 3/0943; H01S 3/09705
USPC ...................... 372/55–61; 454/228, 230, 184; 415/213.1, 214.1, 215.1, 119, 220
See application file for complete search history.

(56) References Cited

U.S. PATENT DOCUMENTS 2,335,508 A * 11/1943 Gustafsson et al. .......... 415/220
(Continued)

FOREIGN PATENT DOCUMENTS

| JP | 60-138046 A | 7/1985 |
| JP | 62-232983 A | 10/1987 |
| JP | 2000-27799 A | 1/2000 |

OTHER PUBLICATIONS

International Search Report (PCT/ISA/210) mailed on Sep. 13, 2011, by the Japanese Patent Office as the International Searching Authority for International Application No. PCT/JP2011/063225.

*Primary Examiner* — Colleen A Matthews
*Assistant Examiner* — Delma R Forde
(74) *Attorney, Agent, or Firm* — Buchanan Ingersoll & Rooney PC (57) ABSTRACT

A blower apparatus includes a blower casing; an elastic member for mounting a mounting portion that projects on an outer circumferential portion of the blower casing, to a blower support member disposed on the inlet side of the mounting portion; and a flange portion provided on the inlet side of the mounting portion. At least three elastic members are disposed in the same plane that is almost orthogonal to a rotation shaft, and adhesion surfaces are provided on both ends, in the rotation shaft direction, of each elastic member. The mounting portion is fixed to one of the adhesion surfaces, and the blower support member is fixed to the other of the adhesion surfaces. The flange portion is provided so as to oppose the blower support member through a gap having a thickness less than a thickness, in the rotation shaft direction, of the elastic member.

5 Claims, 9 Drawing Sheets

(51) Int. Cl.
*F04D 29/64* (2006.01)
*F04D 29/60* (2006.01)
*F04D 29/66* (2006.01)
*H01S 3/036* (2006.01)

(56) References Cited

U.S. PATENT DOCUMENTS

| | | | |
|---|---|---|---|
| 4,611,327 A * | 9/1986 | Clark et al. | 372/58 |
| 4,764,085 A * | 8/1988 | Jesinger | 415/112 |
| 4,764,086 A * | 8/1988 | Jesinger | 415/112 |
| 5,030,068 A * | 7/1991 | Jacobs et al. | 417/363 |
| 5,354,182 A * | 10/1994 | Niemiec et al. | 417/363 |
| 5,528,618 A * | 6/1996 | Schlie et al. | 372/58 |
| 6,597,719 B1 * | 7/2003 | Nara et al. | 372/55 |
| 6,847,671 B1 * | 1/2005 | Baumler | 372/58 |
| 2013/0028710 A1 * | 1/2013 | Kenyon et al. | 415/119 |

* cited by examiner

BLOWER APPARATUS AND GAS LASER OSCILLATION APPARATUS

TECHNICAL FIELD

The present invention relates to blower apparatuses for circulating gas or the like, and gas laser oscillation apparatuses having the same, and more particularly to improving vibration isolation and air-sealing property in mounting portions of the blower apparatuses.

BACKGROUND ART

To date, vibration generator fixing mechanisms for use in fans and the like have been provided with: cylindrical elastic members having grooves on outer circumferential portions; and vibration generator mounting support members having fork-shaped portions that are to be fitted into portions of the grooves formed in the elastic members (see, for example, Patent Document 1).

Further, in conventional gas laser apparatuses, support seats are provided at four portions on a top surface of a blower case, and are fastened via isolators onto support plates by means of bolts, thereby vibration-isolating a blower and an apparatus main unit from each other (see, for example, Patent Document 2).

Moreover, in conventional fan apparatuses, in order to mount a fan apparatus to a fan mounting portion, rubber bushes are firstly fitted through cut portions into mounting holes of three bush mounting portions on the outer circumferential portion of a fan casing, and second cylindrical portions, on inner sides, of the respective bushes, are fitted into mounting bosses, respectively, of the fan mounting portion. Thereafter, mounting screws are screwed into screw holes of the respective mounting bosses, thereby mounting and fixing the fan apparatus to the fan mounting portion (see, for example, Patent Document 3).

CITATION LIST

Patent Document

Patent Document 1: Japanese Laid-Open Utility Model Publication No. 60-138046
Patent Document 2: Japanese Laid-Open Patent Publication No. 62-232983
Patent Document 3: Japanese Laid-Open Patent Publication No. 2000-27799

SUMMARY OF THE INVENTION

Problems to be Solved by the Invention

Blower apparatuses for use in circulating gas or the like are used for, for example, gas laser oscillation apparatuses for use in, for example, laser processing. The gas laser oscillation apparatuses are developed so as to perform high output for improving processing capability, and need to cool a large amount of laser gas. Therefore, high-speed rotation and increase in diameter of the fan are required for the blower apparatuses. In recent years, high torque motors are adopted, and therefore a rotation rate of the blower apparatus exceeds 10000 rpm. However, vibration of the blower apparatus is increased due to high-speed rotation of the blower apparatus or increase in diameter of the fan, and the vibration is transmitted to a casing of the gas laser oscillation apparatus, which may cause vibration and noise in the gas laser oscillation apparatus.

In the conventional mounting structure of the vibration generator, although the fan or the like is supported with the use of the elastic member, the fan or the like is fixed by a mounting member passing through the center of the elastic member. Therefore, vibration of the fan or the like is transmitted through the mounting member to a casing to which the fan or the like is mounted. Thus, a problem arises that vibration isolation effect cannot be sufficiently obtained. Moreover, a large gap is formed such that, when vibration occurs, the casing to which the fan or the like is mounted, and the mounting support member are prevented from contacting with each other, and therefore a problem arises that air-sealing property is degraded in a mounting portion.

Furthermore, in the conventional laser apparatuses described above, the support seats are fastened via the isolators onto the support plates by means of the bolts, thereby mounting the blower to the apparatus main unit. Therefore, the bolts pass through the isolators, and vibration of the blower is transmitted to the apparatus main unit through the bolts. Thus, a problem arises that vibration isolation effect cannot be sufficiently obtained.

Further, in the conventional fan apparatus described above, the rubber bushes are fitted into the mounting bosses, respectively, and the mounting screws are screwed into the screw holes of the mounting bosses, to fix the fan apparatus to the fan mounting portion. Therefore, the mounting bosses and the mounting screws pass through the bushes, and vibration of the fan is transmitted to the fan mounting portion through the mounting screws. Thus, a problem arises that vibration isolation effect cannot be sufficiently obtained.

The present invention has been made to solve the aforementioned problems, and an object of the present invention is to make available a blower apparatus that has improved vibration isolation property, and a gas laser oscillation apparatus that has the blower apparatus to reduce vibration and noise.

Means of Solution to the Problems

A blower apparatus according to the present invention includes a motor; blades, mounted to a rotation shaft of the motor, for flowing gas in a rotation shaft direction by rotation of the motor; a blower casing for accommodating the motor and the blades, the blower casing being open on a gas inlet side and a gas outlet side; an elastic member for mounting a mounting portion that projects on an outer circumferential portion of the blower casing, to a blower support member, disposed on the inlet side of the mounting portion, of a mounting subject; and a flange portion provided, on the whole outer circumferential portion of the blower casing, on the inlet side of the mounting portion. The number of the elastic member disposed in the same plane that is almost orthogonal to the rotation shaft is greater than or equal to three, and the rotation shaft is located inside a polygon of which the vertexes are each elastic member. Adhesion surfaces that are almost orthogonal to the rotation shaft, are provided on both ends, in the rotation shaft direction, of each elastic member, and the mounting portion is adhered and fixed to one of the adhesion surfaces, and the blower support member is adhered and fixed to the other of the adhesion surfaces. The flange portion is provided so as to oppose the blower support member through a gap having a thickness less than a thickness, in the rotation shaft direction, of the elastic member.

Further, a gas laser oscillation apparatus according to the present invention excites laser gas by electric discharge, to generate laser light, and circulates the laser gas by using a blower apparatus. The blower apparatus includes a motor; blades, mounted to a rotation shaft of the motor, for flowing gas in a rotation shaft direction by rotation of the motor; a blower casing for accommodating the motor and the blades, the blower casing being open on a gas inlet side and a gas outlet side; an elastic member for mounting a mounting portion that projects on an outer circumferential portion of the blower casing, to a blower support member, disposed on the inlet side of the mounting portion, of a mounting subject; and a flange portion provided, on the whole outer circumferential portion of the blower casing, on the inlet side of the mounting portion. The number of the elastic member disposed in the same plane that is almost orthogonal to the rotation shaft is greater than or equal to three, and the rotation shaft is located inside a polygon of which the vertexes are each elastic member. Adhesion surfaces that are almost orthogonal to the rotation shaft, are provided on both ends, in the rotation shaft direction, of each elastic member, and the mounting portion is adhered and fixed to one of the adhesion surfaces, and the blower support member is adhered and fixed to the other of the adhesion surfaces. The flange portion is provided so as to oppose the blower support member through a gap having a thickness less than a thickness, in the rotation shaft direction, of the elastic member.

Effect of the Invention

According to the blower apparatus described above, adhesion surfaces that are almost orthogonal to the rotation shaft, are provided on both ends, in the rotation shaft direction, of each elastic member, and the mounting portion is adhered and fixed to one of the adhesion surfaces, and the blower support member is adhered and fixed to the other of the adhesion surfaces. Therefore, vibration of the blower apparatus is less likely to be transmitted to the blower support member, and the blower apparatus having a vibration isolation effect enhanced can be provided.

The adhesion surfaces are almost orthogonal to the rotation shaft, thereby effectively preventing transmission of vibration in the radial direction. Further, since displacement of the elastic member in the axial direction due to vibration in the axial direction is reduced, even when the flange portion is provided so as to oppose the blower support member through a gap having a thickness less than a thickness, in the rotation shaft direction, of the elastic member, contact of the flange portion with the blower support member can be prevented.

Leakage of gas can be minimized by the flange portion.

The gas laser oscillation apparatus described above includes the blower apparatus. In the blower apparatus, adhesion surfaces that are almost orthogonal to the rotation shaft, are provided on both ends, in the rotation shaft direction, of each elastic member of the blower apparatus, and the mounting portion is adhered and fixed to one of the adhesion surfaces, and the blower support member is adhered and fixed to the other of the adhesion surfaces. Therefore, transmission of vibration of the blower apparatus to a casing of the gas laser oscillation apparatus is effectively prevented, and vibration and noise in the gas laser oscillation apparatus can be reduced.

The adhesion surfaces are almost orthogonal to the rotation shaft, thereby effectively preventing transmission of vibration in the radial direction. Further, since displacement of the elastic member in the axial direction due to vibration in the axial direction is reduced, even when the flange portion is provided so as to oppose the blower support member through a gap having a thickness less than a thickness, in the rotation shaft direction, of the elastic member, contact of the flange portion with the blower support member can be prevented.

Leakage of gas can be minimized by the flange portion, and laser gas can be smoothly circulated in the casing.

EMBODIMENTS FOR CARRYING OUT THE INVENTION

Embodiment 1

Hereinafter, embodiment 1 of the present invention will be described.

Figure 1:
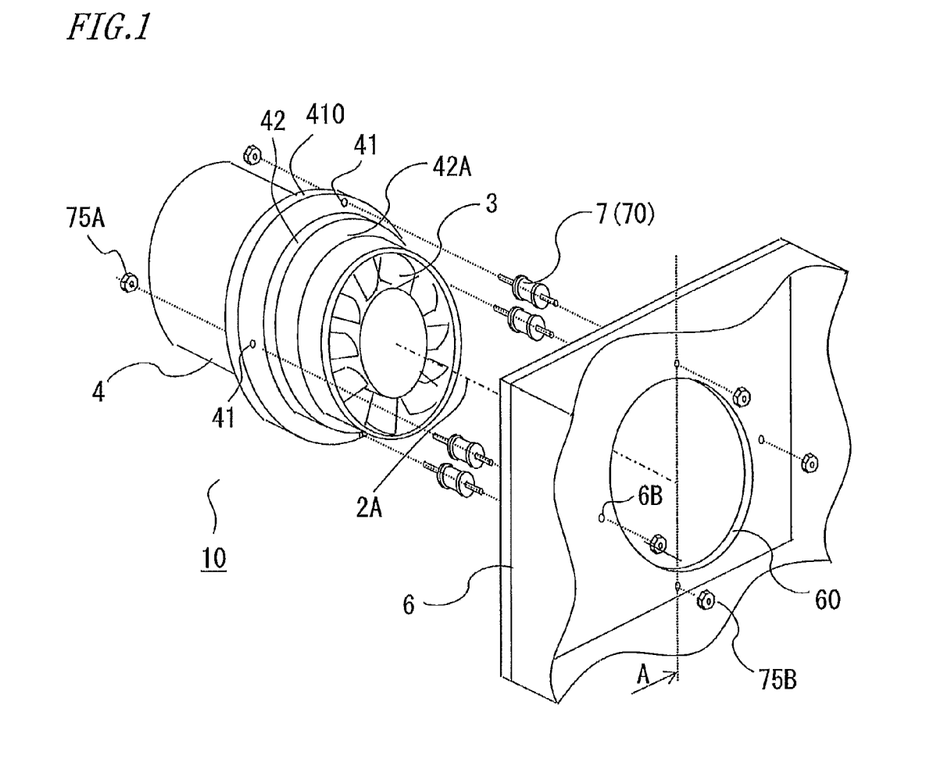
FIG. 1 is a perspective view of a structure of a blower apparatus according to embodiment 1 of the present invention.
Figure 2:
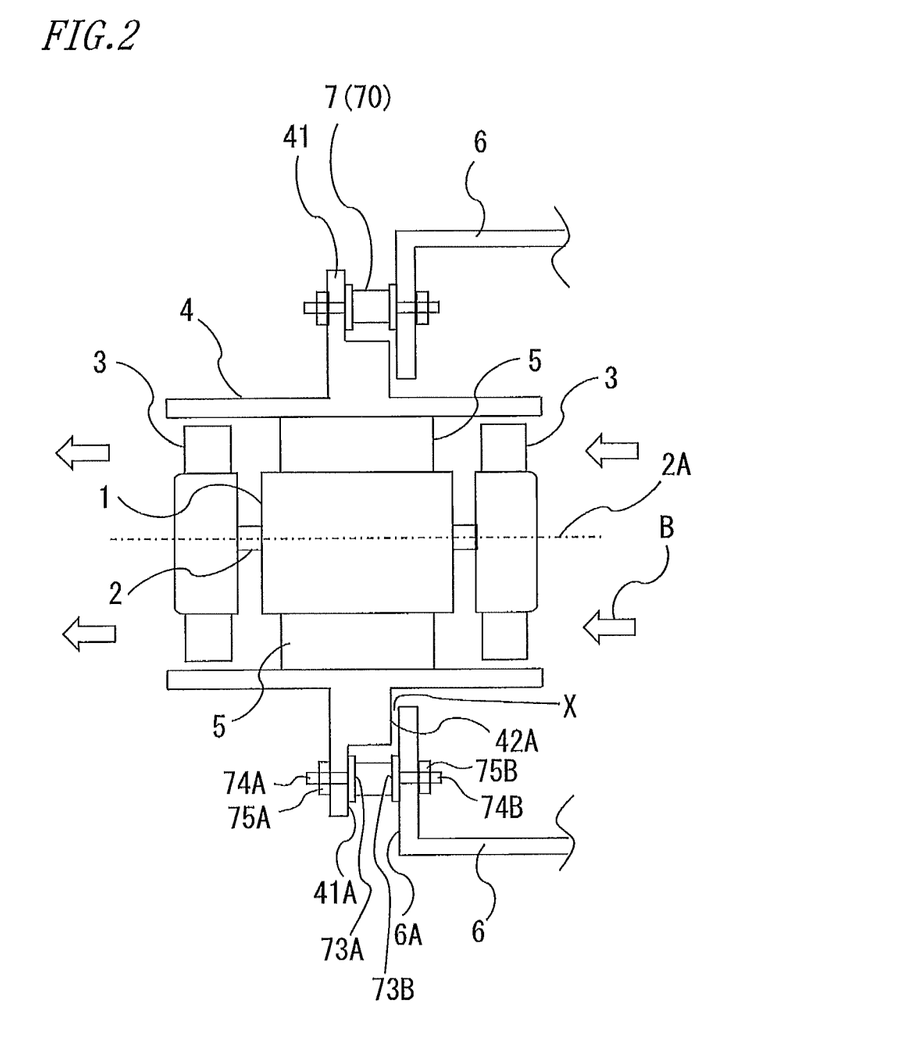
FIG. 2 is a cross-sectional view illustrating a state where the blower apparatus according to embodiment 1 of the present invention is mounted to a blower support member of a mounting subject.

FIG. 1 is a perspective view of a structure of a blower apparatus 10 according to embodiment 1 of the Present invention. FIG. 2 is a cross-sectional view illustrating a state where the blower apparatus 10 is mounted to a blower support member of a mounting subject, as viewed from a direction indicated by an arrow A in FIG. 1.

As shown in FIG. 1 and FIG. 2, the blower apparatus 10 includes: a motor 1 such as a DC brushless motor or an induction motor; movable blades 3 that are blades, mounted on both sides, in the axial direction, of a rotation shaft 2 of the motor 1, for flowing gas in the rotation axis direction by rotation of the motor 1; and a blower casing 4 that has a roughly cylindrical shape, accommodates the motor 1 and the movable blades 3 thereinside, and is open on a gas inlet side and a gas outlet side. The motor 1 is supported by the blower casing 4 via a stationary blade 5. In FIG. 2, an arrow B represents a direction in which gas flows, and the right side of the blower casing 4 is the inlet side, and the left side of the blower casing 4 is the outlet side. Furthermore, in FIG. 1 and FIG. 2, a dashed-dotted line 2A represents an axis line of the rotation shaft 2.

In embodiment 1, the blower casing 4 has a roughly cylindrical shape. However, the shape is not limited thereto. The shape of the blower casing 4 may be, for example, a tubular shape having a roughly quadrangular cross-section. Further, the movable blades 3 are provided at both ends, in the axial direction, of the rotation shaft 2. However, the movable blade 3 may be provided at one of the ends. Further, the stationary blade 5 is provided as a support portion for the motor 1. However, a motor support structure other than the stationary blade may be used.

The blower casing 4 has a projection 410 that is formed on the whole outer circumferential portion so as to project outward, and the projection 410 has mounting portions 41 at four positions such that the mounting portions 41 are disposed at the radially equivalent positions and equally spaced from each other in the circumferential direction. The mounting portions 41 each have a mounting hole formed therein. On the inlet side of the mounting portions 41, a blower support member 6, of a mounting subject, which has an opening 60 having a roughly circular shape, is disposed so as to surround the blower casing 4. The mounting portions 41 are each mounted to the blower support member 6 via a rubber-like elastic member 7.

On the inlet side of the projection 410 having the mounting portions 41 formed therein, a ring-shaped flange portion 42 is provided on the whole outer circumferential portion of the blower casing 4 so as to project radially outward. In embodiment 1, the projection 410 and the flange portion 42 are integrated with each other. A flange surface 42A, on the inlet side, of the flange portion 42 and a support surface 6A of the blower support member 6 oppose each other, to form, on the whole circumference of a mounting range portion, a gap X having a thickness less than a thickness, in the rotation axis direction, of the elastic member 7. Further, the elastic member 7 is disposed radially outward of the flange portion 42.

In embodiment 1, the mounting portions 41 are provided at four positions such that the mounting portions 41 are disposed at the radially equivalent positions and equally spaced from each other in the circumferential direction, and the number of the elastic members 7 provided is four. However, the present invention is not limited thereto. The elastic members 7 may be disposed such that the number of the elastic members 7 is greater than or equal to three, and, when the elastic members 7 are assumed to be vertexes of a polygon, the rotation shaft 2 is disposed inside the polygon.

Further, in embodiment 1, the blower casing 4 has the ring-shaped projection 410, and the projection 410 has the mounting portions 41. However, the present invention is not limited thereto as long as the mounting portions 41 are provided so as to project on the outer circumferential portion of the blower casing 4.

Further, in embodiment 1, the flange portion 42 is disposed radially inward of the mounting portions 41. However, the present invention is not limited thereto. For example, the mounting portions 41 may be disposed radially inward of the projection 410, and the flange portion 42 that projects from the projection 410 toward the inlet may be disposed radially outward of the mounting portions 41.

Figure 3:
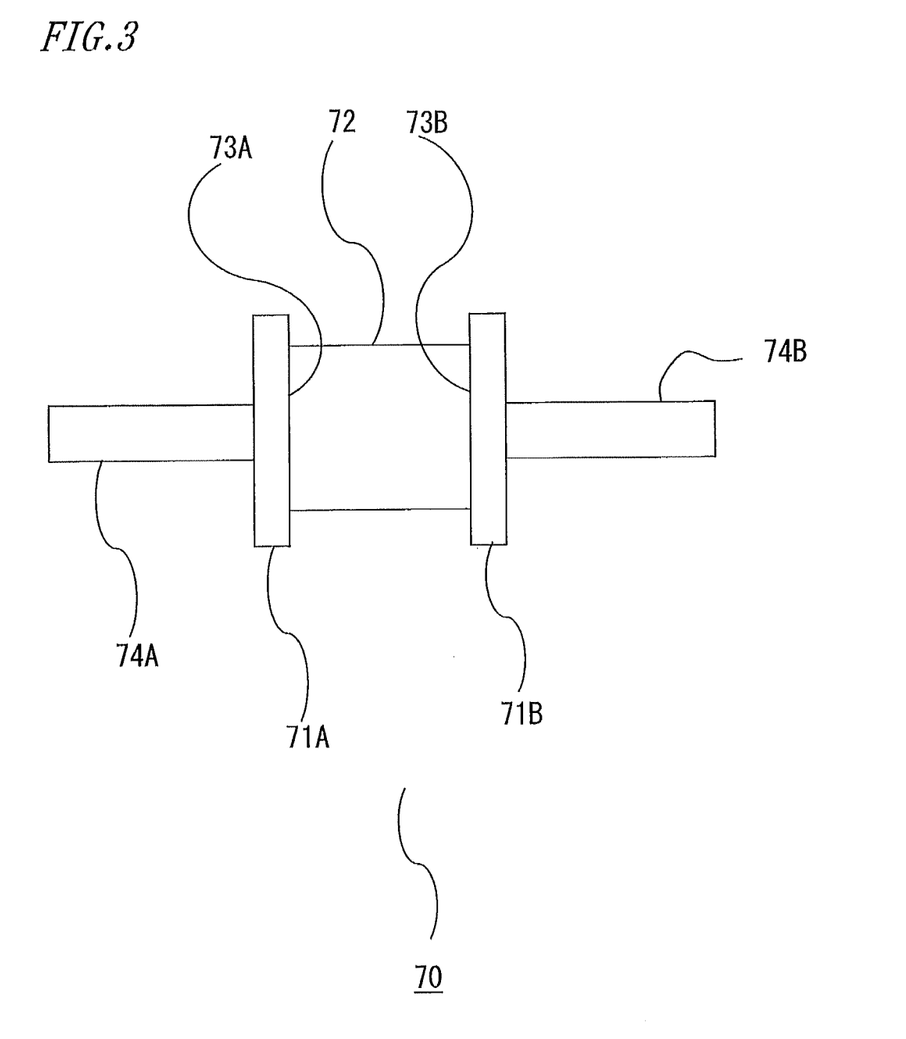
FIG. 3 is an enlarged view of a vibration isolation rubber according to embodiment 1 of the present invention.

Next, the rubber-like elastic member 7 will be described. In embodiment 1, a vibration isolation rubber 70 is used as the elastic member 7. The vibration isolation rubber 70 has a standard structure. FIG. 3 is an enlarged view of the vibration isolation rubber 70. In the vibration isolation rubber 70, a rubber 72 is disposed between two metal plates 71A and 71B that are parallel to each other, and each of the metal plates 71A and 71B, and the rubber portion 72 are adhered and fixed to each other, and adhesion surfaces 73A and 73B are formed. On sides of the metal plates 71A and 71B reverse to the adhesion surfaces 73A and 73B, fixing screws 74A and 74B, respectively, are provided.

To a mounting surface 41A of each mounting portion 41 on the inlet side, one metal plate 71A of the vibration isolation rubber 70 is fixed via a mounting hole of the mounting portion 41 by means of the screw 74A and a nut 75A. On the other hand, to the support surface 6A, of the blower support member 6, which opposes the mounting surface 41A, the other metal plate 71B of the vibration isolation rubber 70 is fixed via a mounting hole 6B of the blower support member 6 by means of the screw 74B and a nut 75B. The mounting surface 41A and the support surface 6A are almost orthogonal to the rotation shaft 2, and the adhesion surfaces 73A and 73B on which the rubber portion 72 is adhered to the metal plates 71A and 71B to be mounted to the mounting surface 41A and the support surface 6A, respectively, are also almost orthogonal to the rotation shaft 2. Each mounting portion 41 and the vibration isolation rubber 70 are fixed to each other, and the blower support member 6 and the vibration isolation rubber 70 are fixed to each other, due to adhesive force of the adhesion surfaces 73A and 73B, respectively, of the rubber portion 72, between each mounting portion 41 and the blower support member 6. Since fixing pins or the like are not inserted into the rubber portion 72, elasticity of the rubber itself can be sufficiently exhibited.

In embodiment 1, the vibration isolation rubber 70 having the metal plates 71A and 71B is used as the elastic member 7. However, the present invention is not limited thereto. For example, a rubber member may be directly adhered to the mounting surface 41A and the support surface 6A.

Vibration of the blower apparatus due to rotation of the movable blades will be described. According to an experiment conducted for vibration of the blower apparatus by the applicant, it has been found that vibration of the blower apparatus is such that a vibrating force in the radial direction orthogonal to the rotation axis is greater than a vibrating force in the rotation axis direction. A centrifugal force generated due to imbalance relative to a rotation shaft of a rotor of the motor, is proportional to the square of the rotation speed. Therefore, according to rotation of the blower apparatus at a high speed exceeding 10000 rpm in recent years, a great centrifugal force is generated, and a vibrating force in the radial direction further increases. Further, it is difficult to isolate vibration due to imbalance relative to the rotor since the vibration has a low frequency similar to a rotational frequency of the blower apparatus. As a rubber for isolating vibration having a great vibrating force or a low frequency, a rubber having a small spring constant which enhances a vibration isolation effect, is appropriate. Vibration or the like due to, for example, magnetic poles of the motor or variation in the movable blades has a high frequency which is at least several times higher than the rotation speed, and can be relatively easily isolated, as compared to vibration due to imbalance relative to the rotor.

On the other hand, in rubber, a spring constant in a shear direction and a spring constant in a compression direction are greatly different in general. For example, in rubber based on natural rubber, a spring constant in a shear direction is about $\frac{1}{7}$ times less than a spring constant in a compression direction.

From the standpoints described above, an action and effect of each component of the blower apparatus 10 according to embodiment 1 will be described.

Each mounting portion 41 of the blower casing 4 is mounted to the blower support member 6 by adhesion via the rubber portion 72. The adhesion surfaces 73A and 73B thereof are almost orthogonal to the rotation shaft 2. Initially, an action and effect exhibited by such a structure will be described.

In such a structure, the rubber portion 72 acts in a shear direction in which a spring constant is small, with respect to vibration, in the radial direction, generated in the blower apparatus 10. Therefore, a great vibrating force, having a low frequency, generated due to imbalance relative to the rotor can be effectively prevented from being transmitted to the blower support member 6.

On the other hand, the rubber portion 72 acts in a compression direction, with respect to vibration, in the rotation axis direction, generated in the blower apparatus 10. In the compression direction of the rubber portion 72, a spring constant is great and a support force is thus great, and displacement of the rubber portion 72 in the axial direction due to a suction force of the blower apparatus 10 or vibration of the blower apparatus 10 in the rotation axis direction, is small. Therefore, change of a distance in the axial direction between the mounting portions 41 and the blower support member 6 is small, and contact between the flange portion 42 and the blower support member 6 can be prevented.

Further, a strength of rubber in the rubber compression direction is also high. Therefore, damage of the rubber portion 72 due to a compression load caused by a great suction force of the blower apparatus 10 can be prevented.

Moreover, in a case where the rubber portion 72 is adhered and fixed by the adhesion surfaces 73A and 73B, a stress distribution is uniform and a stress is not locally increased, thereby improving durability.

In embodiment 1, an exemplary case where the elastic member 7 is formed by rubber, is described. The material is not limited thereto. The elastic member 7 may be formed by plastic or the like.

Next, an effect of the flange portion 42 provided on the whole outer circumferential portion of the blower casing 4 will be described.

In the structure of embodiment 1, a gap corresponding to a thickness, in the axial direction, of the vibration isolation rubber 70 occurs between each mounting portion 41 and the blower support member 6. In a case where the ring-shaped flange portion 42 is provided, a uniform gap can be formed, on the whole circumference, between the flange portion 42 and the blower support member 6, and the gap in the mounting portion can be reduced. Therefore, leakage of gas at the mounting portion of the blower apparatus 10 can be prevented. Further, as described above, change of a distance in the axial direction between the mounting portions 41 and the blower support member 6 is small. Therefore, a great gap for preventing contact between the flange portion 42 and the blower support member 6 need not be formed, and the gap can be further reduced within a range in which the contact therebetween can be prevented. Thus, air-sealing property can be further improved in the mounting portion of the blower apparatus 10.

Next, an action and effect obtained when the vibration isolation rubber 70 is disposed on the inlet side of each mounting portion 41, will be described.

In a case where the vibration isolation rubber 70 is disposed on the inlet side of each mounting portion 41, a suction force due to rotation of the movable blades 3 is applied so as to compress the adhesion surfaces 73A and 73B of the vibration isolation rubber 70. Therefore, separation in the adhering portion can be prevented.

Figure 4:
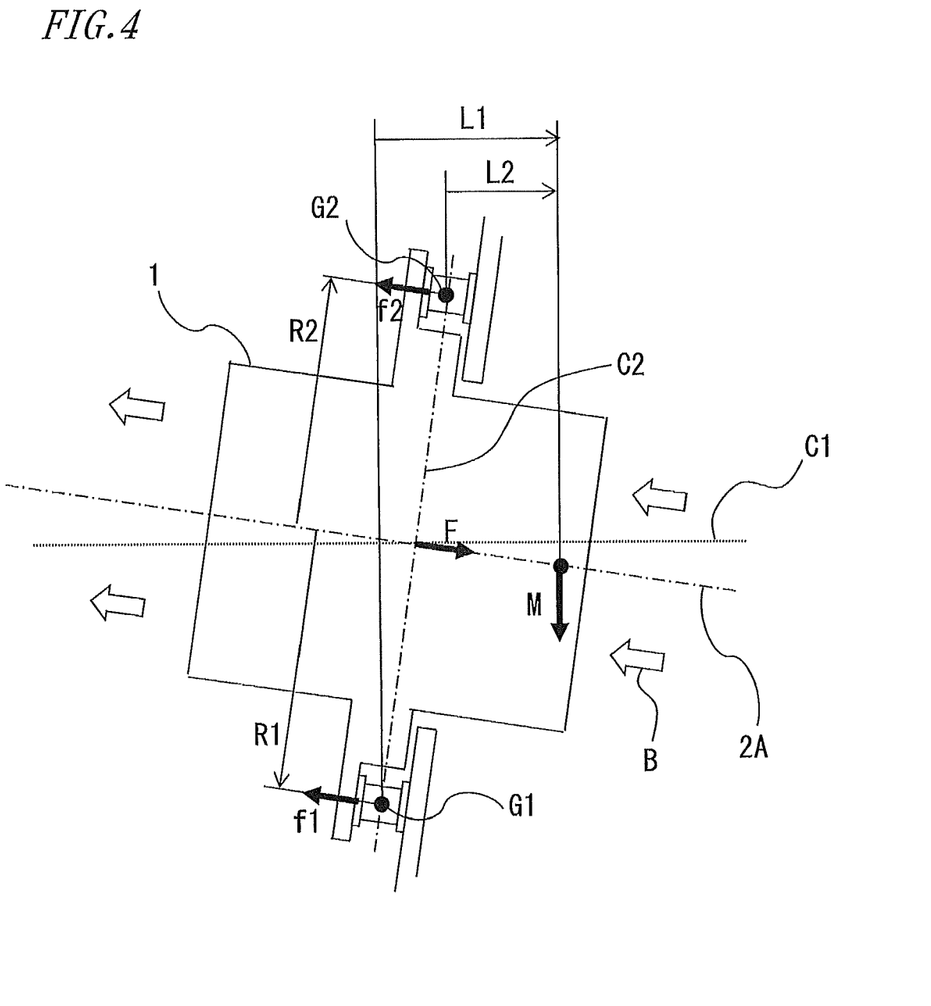
FIG. 4 illustrates an equilibrium of forces applied to the blower apparatus when the blower apparatus according to embodiment 1 of the present invention is mounted, as viewed from the horizontal direction that is orthogonal to a rotation shaft.
Figure 5:
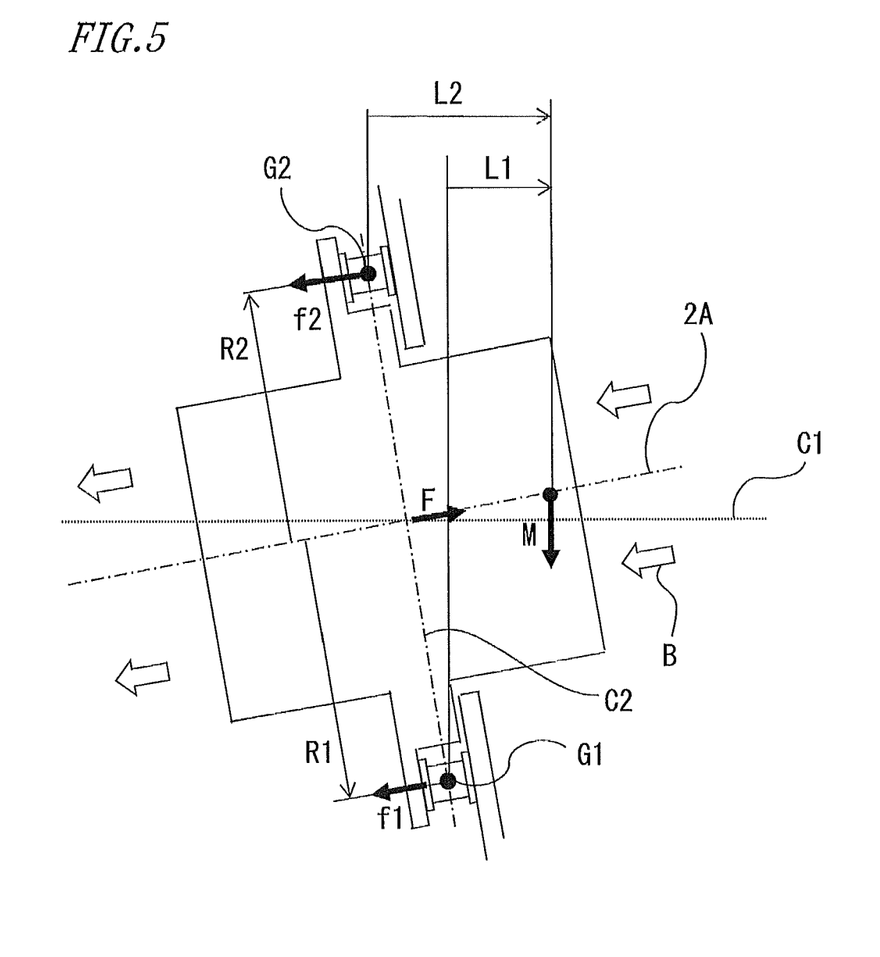
FIG. 5 illustrates an equilibrium of forces applied to the blower apparatus when the blower apparatus according to embodiment 1 of the present invention is mounted, as viewed from the horizontal direction that is orthogonal to the rotation shaft.

Further, a manner in which the vibration isolation rubber 70 is disposed for assuredly preventing separation in the adhering portion, will be described. FIG. 4 and FIG. 5 illustrate an equilibrium of forces applied to the blower apparatus 10 when the blower apparatus 10 is mounted to the blower support member 6, as viewed from the horizontal direction that is orthogonal to the rotation shaft 2. FIG. 4 illustrates a case where the inlet side of the blower apparatus 10 faces downward and FIG. 5 illustrates a case where the inlet side thereof faces upward. The vibration isolation rubber 70 is disposed so as to satisfy any one of the following six conditional expressions. In FIG. 4 and FIG. 5, a dotted line C1 represents a line extending in the horizontal direction, and a dashed-dotted line C2 represents a line orthogonal to the rotation shaft 2.

$$L2 \leq L1, L2 > 0, F \cdot R2 - M \cdot L2 \geq 0 \quad (1)$$

$$L2 \leq L1, L2 \leq 0, L1 \geq 0 \quad (2)$$

$$L2 \leq L1, L1 < 0, F \cdot R1 + M \cdot L1 \geq 0 \quad (3)$$

$$L2 > L1, L1 > 0, F \cdot R2 - M \cdot L2 \geq 0 \quad (4)$$

$$L2 > L1, L1 < 0, L2 > 0, F \cdot R1 + M \cdot L1 \geq 0, F \cdot R2 - M \cdot L2 \geq 0 \quad (5)$$

$$L2 > L1, L2 < 0, F \cdot R1 + M \cdot L1 \geq 0 \quad (6)$$

Reference characters indicated in FIGS. 4 and 5 and each of the above-described expressions, represent the following.

G1: the center of gravity of the vibration isolation rubber 70 located at the lowest position
G2: the center of gravity of the vibration isolation rubber 70 located at the highest position
L1: a distance in the horizontal direction from G1 to the center of gravity of the blower apparatus 10 (the inlet side is positive)
L2: a distance in the horizontal direction from G2 to the center of gravity of the blower apparatus 10 (the inlet side is positive)
M: the gravitational force applied to the blower apparatus 10 (positive value)
F: a suction force of the blower apparatus 10 (positive value)
R1: a distance to G1 from an axis line 2A of the rotation shaft (the downward direction is positive)
R2: a distance to G2 from the axis line 2A of the rotation shaft (the upward direction is positive)
f1: a counterforce from G1 in the rotation axis direction (a counterforce generated upon compression at G1 represents a positive value)
f2: a counterforce from G2 in the rotation axis direction (a counterforce generated upon compression at G2 represents a positive value)

An action according to each expression will be described.
According to FIG. 4 and FIG. 5, based on an equilibrium condition between a moment about G1 and a moment about G2, $$M \cdot L1 + F \cdot R1 - f2 \cdot (R1 + R2) = 0 \quad (A)$$

$$M \cdot L2 - F \cdot R2 + f1 \cdot (R1 + R2) = 0 \quad (B)$$

are obtained.
According to expressions (A) and (B), $$(R1 + R2) \cdot f2 = F \cdot R1 + M \cdot L1 \quad (C)$$

$$(R1 + R2) \cdot f1 = F \cdot R2 - M \cdot L2 \quad (D)$$

are obtained. Each vibration isolation rubber 70 is disposed such that, in a case where the vibration isolation rubbers 70 are assumed to be vertexes of a polygon, the rotation shaft 2 is disposed inside the polygon. Therefore, G1 is below the rotation shaft, and G2 is above the rotation shaft. Therefore, R1>0 and R2>0 are satisfied.

Contents of expression (1) will be described.

In a case where the inlet side of the blower apparatus 10 is faced downward (L2≤L1), and the center of gravity of the blower apparatus 10 is closer to the inlet than G2 is (L2>0), L1>0 is satisfied, and therefore f2>0 is satisfied according to expression (C), and the vibration isolation rubber 70 located at the highest position is compressed. Namely, no tensile load is applied at G2. Further, when F·R2−M·L2≥0 is satisfied, f1≥0 is satisfied according to expression (D), and the vibration isolation rubber 70 located at the lowest position is compressed or no load is applied to the vibration isolation rubber 70 located at the lowest position. Namely, no tensile load is applied at G1.

Contents of expression (2) will be described.

In a case where the inlet side of the blower apparatus 10 is faced downward (L2≤L1), and the center of gravity of the blower apparatus 10 is between G1 and G2 (L2≤0, L1≥0), also when F=0 is satisfied according to expressions (C) and (D), f2≥0 and f1≥0 are satisfied, and no tensile load is applied at G1 and G2.

Contents of expression (3) will be described.

In a case where the inlet side of the blower apparatus 10 is faced downward (L2≤L1), and the center of gravity of the blower apparatus 10 is closer to the outlet than G1 is (L1<0), L2<0 is satisfied, and therefore f1>0 is satisfied according to expression (D), and no tensile load is applied at G1. Further, when F·R1+M·L1≥0 is satisfied, f2≥0 is satisfied according to expression (C), and no tensile load is applied at G2.

Contents of expression (4) will be described.

In a case where the inlet side of the blower apparatus 10 is faced upward (L2>L1), and the center of gravity of the blower apparatus 10 is closer to the inlet than G1 is (L1>0), f2>0 is satisfied according to expression (C), and no tensile load is applied at G2. Further, when F·R2−M·L2≥0 is satisfied, f1≥0 is satisfied according to expression (D), and no tensile load is applied at G1.

Contents of expression (5) will be described.

In a case where the inlet side of the blower apparatus 10 is faced upward (L2>L1), and the center of gravity of the blower apparatus 10 is between G2 and G1 (L1<0, L2>0), when F·R1+M·L1≥0 and F·R2−M·L2≥0 are both satisfied, f2≥0 and f1≥0 are satisfied according to expressions (C) and (D), and no tensile load is applied at G1 and G2.

Contents of expression (6) will be described.

In a case where the inlet side of the blower apparatus 10 is faced upward (L2>L1), and the center of gravity of the blower apparatus 10 is closer to the outlet than G2 is (L2<0), L2<0 is satisfied, and f1>0 is satisfied according to expression (D), and no tensile load is applied at G1. Further, when F·R1+M·L1≥0 is satisfied, f2≥0 is satisfied according to expression (C), and no tensile load is applied at G2.

As described above, when the vibration isolation rubber 70 is disposed so as to satisfy any one of conditions (1) to (6), no tensile load is applied to the adhesion surfaces 73A and 73B of the vibration isolation rubber 70 at least when the blower apparatus 10 is operated. Therefore, separation can be assuredly prevented.

It is most advantageous that condition (2) is satisfied. In this case, even when the blower apparatus 10 is at a stop, no tensile load is applied to the adhesion surfaces 73A and 73B.

In embodiment 1, loads applied to two points, that is, the vibration isolation rubber 70 located at the lowest position and the vibration isolation rubber 70 located at the highest position, are examined. However, in the case of three or more points, since safety increases, a problem with the separation does not arise.

Embodiment 2

Figure 6:
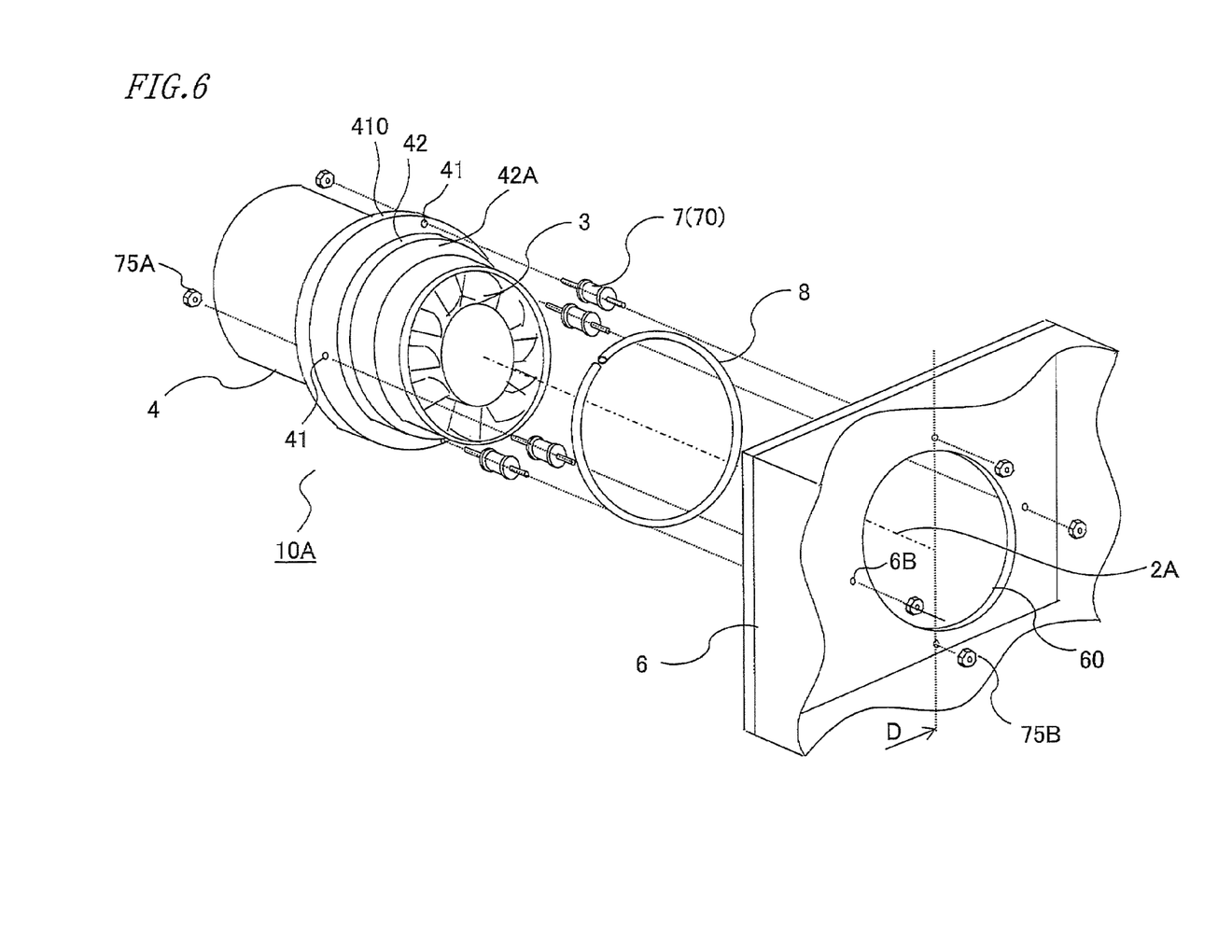
FIG. 6 is a perspective view of a structure of a blower apparatus according to embodiment 2 of the present invention.
Figure 7:
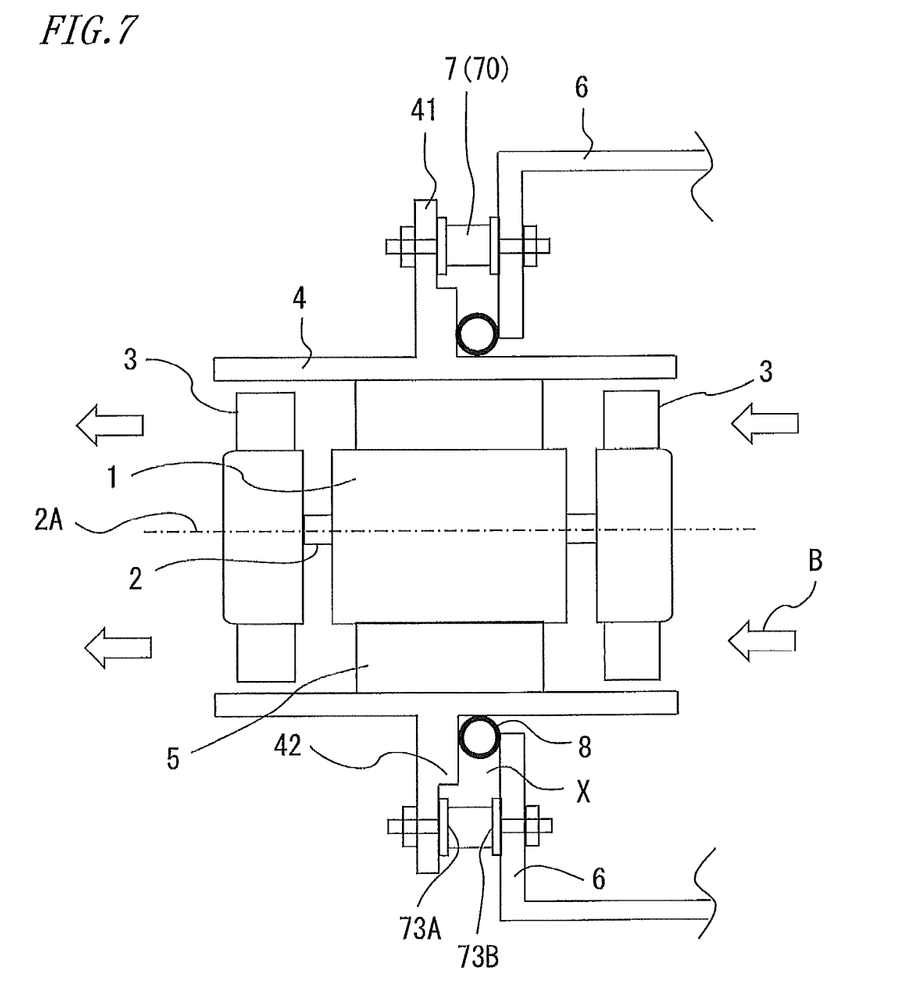
FIG. 7 is a cross-sectional view illustrating a state where the blower apparatus according to embodiment 2 of the present invention is mounted to a blower support member of a mounting subject.

Next, embodiment 2 of the present invention will be described. FIG. 6 is a perspective view of a structure of a blower apparatus 10A according to embodiment 2 of the present invention. FIG. 7 is a cross-sectional view illustrating a state where the blower apparatus 10A is mounted to a blower support member of a mounting subject, as viewed from a direction indicated by an arrow D in FIG. 6.

As shown in FIG. 6 and FIG. 7, in embodiment 2, in addition to the components of embodiment 1, a rubber tube 8 that is a hollow elastic member is provided in the gap X between the flange portion 42 and the blower support member 6. The same components as in embodiment 1 are denoted by the same reference numerals, and the description thereof is not given.

The rubber tube 8 has a diameter slightly greater than the gap X, and is formed into an annular shape. The annular rubber tube 8 is disposed in the gap X in a compressed state to seal the gap, thereby further improving an air-sealing property in the mounting portion of the blower apparatus 10A.

When the hollow rubber tube 8 is used, the following effect can be obtained as compared to a case where a solid rubber is used. In a compressed state, a spring constant of the hollow rubber tube 8 is less than that of a solid rubber. Therefore, when the rubber tube 8 is disposed in the gap in a compressed state, a tensile load on the adhesion surfaces 73A and 73B of the vibration isolation rubber 70 is low, and separation can be prevented.

Further, the vibration isolation rubber 70 acts in the compression direction, with respect to vibration in the rotation axis direction. Therefore, displacement of the vibration isolation rubber 70 in the axial direction is small. Thus, even when a contraction allowance of the rubber tube 8 is reduced, a gap due to vibration is not generated, and air-sealing property is maintained. Since the contraction allowance can be reduced, a counterforce is small in a contracted state, and a tensile load on the adhesion surfaces 73A and 73B of the vibration isolation rubber 70 can be reduced to an ignorable level. In embodiment 2, the hollow elastic member is formed by rubber. However, the elastic member may be formed by plastic or the like.

Also when, instead of the hollow rubber tube 8, a sponge is disposed, the same effect can be obtained. A sponge has pores thereinside, and has a small spring constant upon compression. Therefore, a sponge need not have a hollow tubular shape, and a sponge having an outer diameter greater than the gap X may be used.

Embodiment 3

Next, embodiment 3 of the present invention will be described. A gas laser oscillation apparatus according to embodiment 3 includes the blower apparatus 10 according to embodiment 1 as described above.

Figure 8:
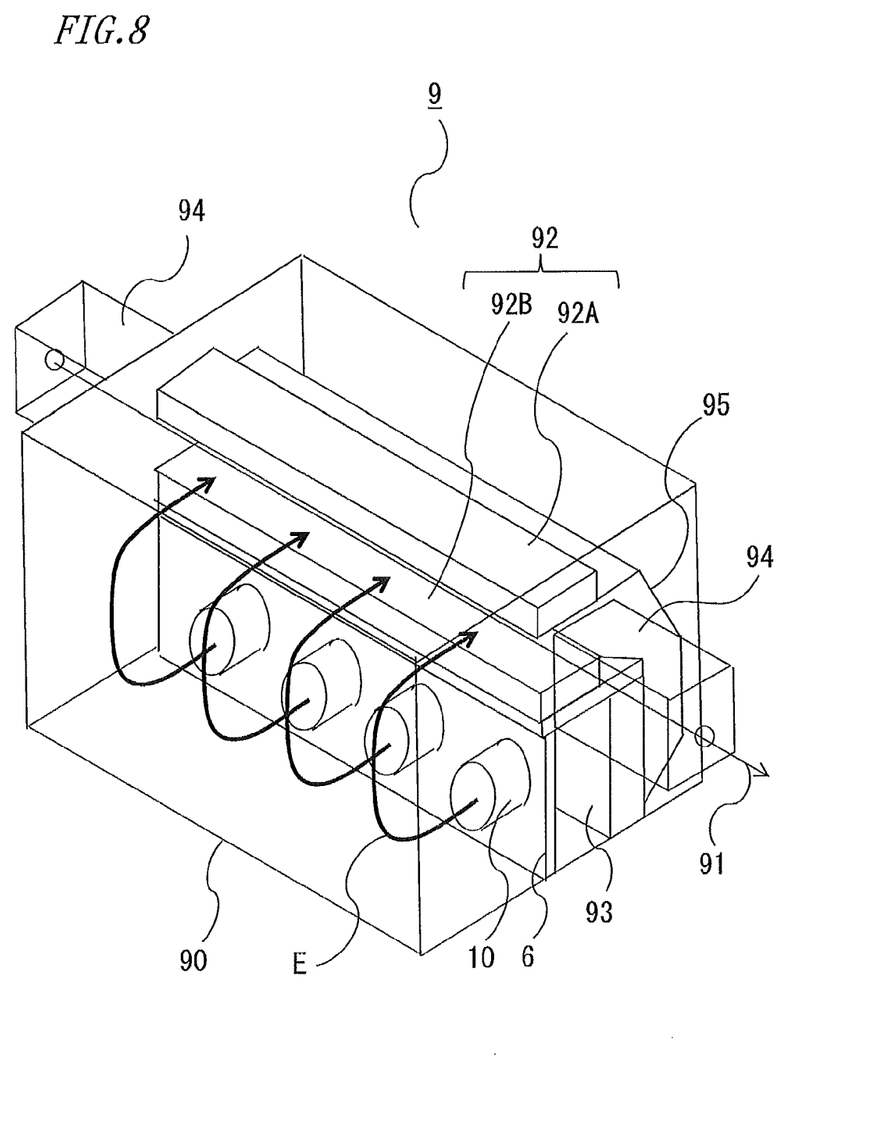
FIG. 8 is a perspective view schematically illustrating a structure of a gas laser oscillation apparatus according to embodiment 3 of the present invention.
Figure 9:
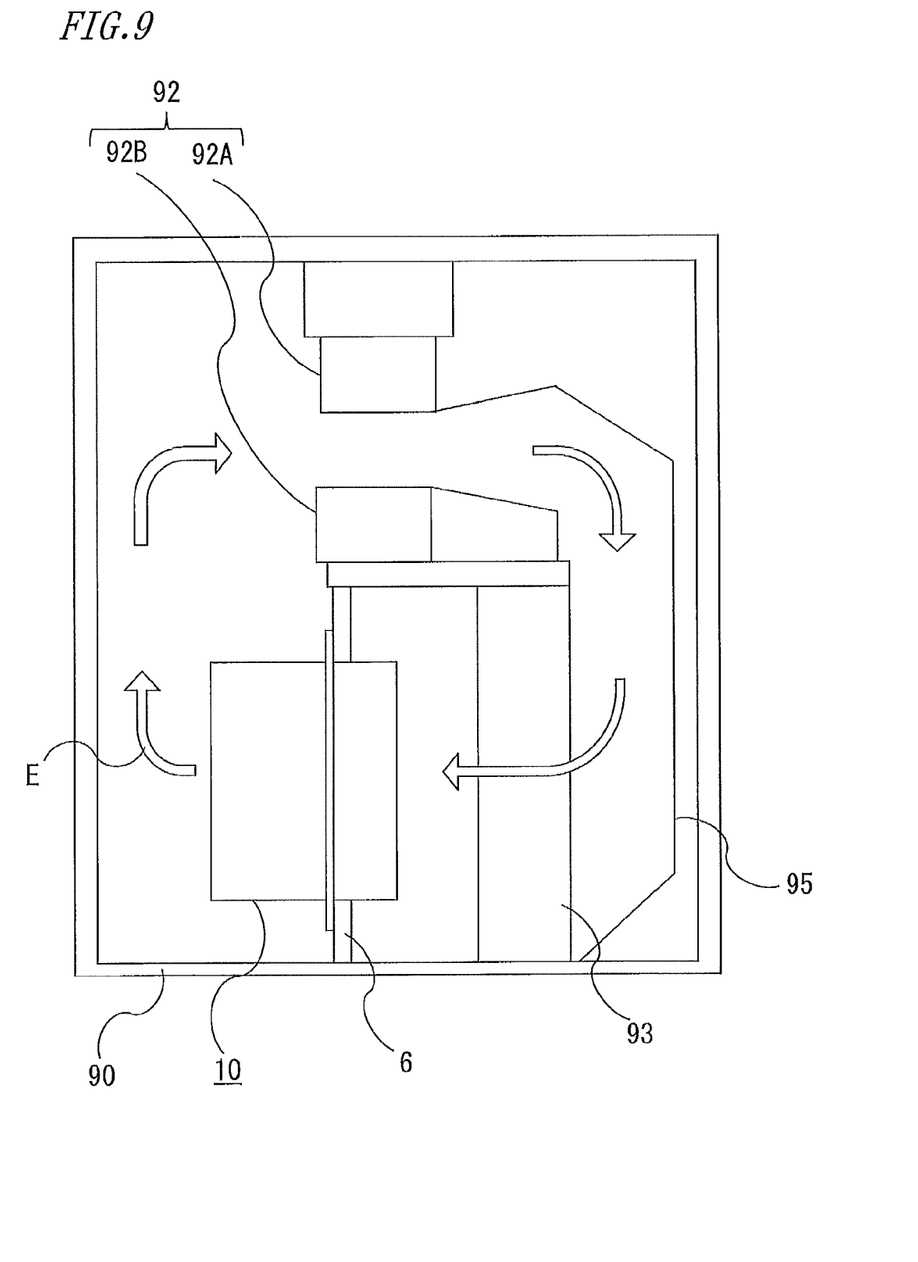
FIG. 9 is a cross-sectional view schematically illustrating the structure of the gas laser oscillation apparatus according to embodiment 3 of the present invention.

FIG. 8 is a perspective view schematically illustrating a structure of a gas laser oscillation apparatus 9. FIG. 9 is a cross-sectional view schematically illustrating a structure of the gas laser oscillation apparatus 9.

The gas laser oscillation apparatus 9 includes, in a casing 90, an oscillation means 92 for oscillating laser light 91, the blower apparatuses 10 for circulating laser gas through the oscillation means 92 in the direction indicated by an arrow E, and a heat exchanger 93 for cooling the circulating laser gas during circulation.

The oscillation means 92 includes a pair of laterally-elongated electrodes 92A and 92B that are disposed one above the other so as to oppose each other. Laser gas is excited by electric discharge between the electrodes 92A and 92B, to generate the laser light 91 due to stimulated emission thereof. A pair of reflection means 94 for repeatedly reflecting the laser light 91 to amplify the light is disposed on both ends lateral to the electrodes 92A and 92B, and the laser light 91 is amplified and outputted while repeatedly passing through the excited laser gas by means of the reflection means 94. The heat exchanger 93 is mounted to the casing 90, and a duct 95 for guiding the laser gas is provided between the electrodes 92A and 92B, and the heat exchanger 93. The laser gas is excited and has its temperature increased, and the increase in temperature causes reduction of output of the laser light 91. Therefore, the laser gas is cooled by the heat exchanger 93 during circulation to prevent reduction of output of the laser light 91. On the downstream side, in the gas circulating direction, of the heat exchanger 93, the blower apparatuses 10 are mounted to the casing 90 via the blower support member 6, and circulate the laser gas in the casing 90. The structure of each blower apparatus 10 and a manner in which each blower apparatus 10 is mounted to the blower support member 6 are as described above for embodiment 1. In FIG. 8 and FIG. 9, each component is not shown and the description thereof is omitted.

As described above, since the gas laser oscillation apparatus 9 of embodiment 3 includes the blower apparatus 10 of embodiment 1, the same effect as in embodiment 1 is obtained. Transmission of the vibration of the blower apparatus 10 to the casing 90 of gas laser oscillation apparatus 9 is effectively prevented, and vibration and noise can be reduced in the gas laser oscillation apparatus 9. Further, a gap in the mounting portion in which the blower apparatus 10 is mounted to the blower support member 6 can be reduced, to reduce leakage of gas through the mounting portion. Therefore, the laser gas can be smoothly circulated in the casing 90.

In embodiment 3, the blower apparatuses 10 of embodiment 1 are used. However, the blower apparatuses 10A of embodiment 2 may be used. In this case, leakage of gas through the mounting portion of the blower apparatuses 10A can be further reduced.

INDUSTRIAL APPLICABILITY

The present invention can be widely applicable to blower apparatuses disposed in gas laser oscillation apparatuses and the like, and vibration isolation and air-sealing property can be improved at a mounting portion of the blower apparatus.

The invention claimed is:
1. A blower apparatus comprising:
a motor;
blades, mounted to a rotation shaft of the motor, for flowing gas in a rotation shaft direction by rotation of the motor;
a blower casing for accommodating the motor and the blades, the blower casing being open on a gas inlet side and a gas outlet side;
an elastic member for mounting a mounting portion that projects on an outer circumferential portion of the blower casing, to a blower support member, disposed on the inlet side of the mounting portion, of a mounting subject; and a flange portion provided, on the whole outer circumferential portion of the blower casing, on the inlet side of the mounting portion, wherein
the number of the elastic member disposed in the same plane that is almost orthogonal to the rotation shaft is greater than or equal to three, and the rotation shaft is located inside a polygon of which the vertexes are each elastic member,
adhesion surfaces that are almost orthogonal to the rotation shaft, are provided on both ends, in the rotation shaft direction, of each elastic member, and the mounting portion is adhered and fixed to one of the adhesion surfaces, and the blower support member is adhered and fixed to the other of the adhesion surfaces, and
the flange portion is provided so as to oppose the blower support member through a gap having a thickness less than a thickness, in the rotation shaft direction, of the elastic member, and wherein
in a case where the blower apparatus is viewed from the horizontal direction that is orthogonal to the rotation shaft in a state where the blower apparatus is mounted to the blower support member,
when L1 represents a distance, in the horizontal direction, from the center of gravity G1 of the elastic member located at the lowest position among the elastic members, to the center of gravity of the blower apparatus, with the inlet side being defined as being positive,
L2 represents a distance, in the horizontal direction, from the center of gravity G2 of the elastic member located at the highest position among the elastic members, to the center of gravity of the blower apparatus, with the inlet side being defined as being positive,
M represents the gravitational force applied to the center of gravity of the blower apparatus,
F represents a suction force of the blower apparatus,
R1 represents a distance from the rotation shaft to the center of gravity G1 of the elastic member located at the lowest position with the downward direction being defined as being positive, and
R2 represents a distance from the rotation shaft to the center of gravity G2 of the elastic member located at the highest position with the upward direction being defined as being positive,
each elastic member is disposed so as to satisfy any one of conditions (1) to (6) as indicated below:

$$L2 \leq L1, L2 > 0, F \cdot R2 - M \cdot L2 \geq 0 \quad (1)$$

$$L2 \leq L1, L2 \leq 0, L1 \geq 0 \quad (2)$$

$$L2 \leq L1, L1 < 0, F \cdot R1 + M \cdot L1 \geq 0 \quad (3)$$

$$L2 > L1, L1 > 0, F \cdot R2 - M \cdot L2 \geq 0 \quad (4)$$

$$L2 > L1, L1 < 0, L2 > 0, F \cdot R1 + M \cdot L1 \geq 0, F \cdot R2 - M \cdot L2 \geq 0 \quad (5)$$

$$L2 > L1, L2 < 0, F \cdot R1 + M \cdot L1 \geq 0 \quad (6).$$

2. The blower apparatus according to claim 1, wherein a hollow elastic member is provided in a gap between the flange portion and the blower support member.

3. The blower apparatus according to claim 1, wherein a sponge is provided in a gap between the flange portion and the blower support member.

4. The blower apparatus according to claim 1, wherein each elastic member is disposed so as to satisfy condition (2).

5. A gas laser oscillation apparatus for exciting laser gas by electric discharge, to generate laser light, and circulating the laser gas by using a blower apparatus, wherein the blower apparatus comprises:

a motor;

blades, mounted to a rotation shaft of the motor, for flowing gas in a rotation shaft direction by rotation of the motor;

a blower casing for accommodating the motor and the blades, the blower casing being open on a gas inlet side and a gas outlet side;

an elastic member for mounting a mounting portion that projects on an outer circumferential portion of the blower casing, to a blower support member, disposed on the inlet side of the mounting portion, of a mounting subject; and a flange portion provided, on the whole outer circumferential portion of the blower casing, on the inlet side of the mounting portion, wherein the number of the elastic member disposed in the same plane that is almost orthogonal to the rotation shaft is greater than or equal to three, and the rotation shaft is located inside a polygon of which the vertexes are each elastic member, adhesion surfaces that are almost orthogonal to the rotation shaft, are provided on both ends, in the rotation shaft direction, of each elastic member, and the mounting portion is adhered and fixed to one of the adhesion surfaces, and the blower support member is adhered and fixed to the other of the adhesion surfaces, and the flange portion is provided so as to oppose the blower support member through a gap having a thickness less than a thickness, in the rotation shaft direction, of the elastic member, and wherein in the blower apparatus, in a case where the blower apparatus is viewed from the horizontal direction that is orthogonal to the rotation shaft in a state where the blower apparatus is mounted to the blower support member, when L1 represents a distance, in the horizontal direction, from the center of gravity G1 of the elastic member located at the lowest position among the elastic members, to the center of gravity of the blower apparatus, with the inlet side being defined as being positive, L2 represents a distance, in the horizontal direction, from the center of gravity G2 of the elastic member located at the highest position among the elastic members, to the center of gravity of the blower apparatus, with the inlet side being defined as being positive, M represents the gravitational force applied to the center of gravity of the blower apparatus, F represents a suction force of the blower apparatus, R1 represents a distance from the rotation shaft to the center of gravity G1 of the elastic member located at the lowest position with the downward direction being defined as being positive, and R2 represents a distance from the rotation shaft to the center of gravity G2 of the elastic member located at the highest position with the upward direction being defined as being positive, each elastic member is disposed so as to satisfy any one of conditions (1) to (6) as indicated below:

$$L2 \leq L1, L2 > 0, F \cdot R2 - M \cdot L2 \geq 0 \qquad (1)$$

$$L2 \leq L1, L2 \leq 0, L1 \geq 0 \qquad (2)$$

$$L2 \leq L1, L1 < 0, F \cdot R1 + M \cdot L1 \geq 0 \qquad (3)$$

$$L2 > L1, L1 > 0, F \cdot R2 - M \cdot L2 \geq 0 \qquad (4)$$

$$L2 > L1, L1 < 0, L2 > 0, F \cdot R1 + M \cdot L1 \geq 0, F \cdot R2 - M \cdot L2 \geq 0 \qquad (5)$$

$$L2 > L1, L2 < 0, F \cdot R1 + M \cdot L1 \geq 0 \qquad (6).$$

* * * * *